Figure 1:
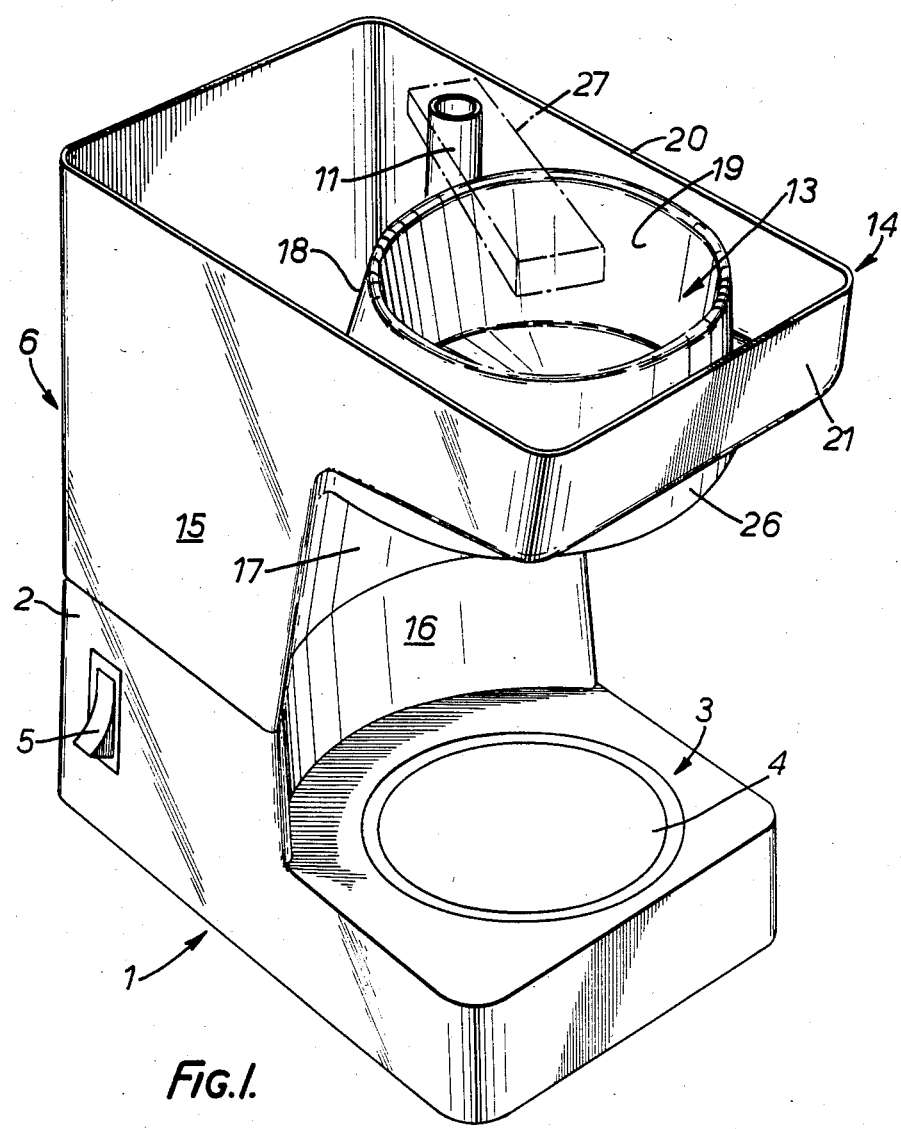

United States Patent [19]

Marchant

[11] Patent Number: 4,558,640
[45] Date of Patent: Dec. 17, 1985

[54] APPARATUS FOR MAKING HOT DRINKS

[75] Inventor: David J. Marchant, Chineham, England

[73] Assignee: Ti Russell Hobbs Limited, Stoke-on-Trent, England

[21] Appl. No.: 589,696

[22] Filed: Mar. 13, 1984

[30] Foreign Application Priority Data

Mar. 15, 1983 [GB] United Kingdom ................. 8307018

[51] Int. Cl.⁴ .............................................. A47J 31/12
[52] U.S. Cl. .......................................... 99/307; 99/300
[58] Field of Search ................ 99/279, 300, 295, 307, 99/302 R, 308, 310, 311, 312; 426/433

[56] References Cited

U.S. PATENT DOCUMENTS 3,718,084 2/1973 Bufkin ................................... 99/312
4,331,067 5/1982 Mysicka ................................ 99/295

FOREIGN PATENT DOCUMENTS 2531811 1/1977 Fed. Rep. of Germany ........ 99/279
1262430 2/1972 United Kingdom .
1329821 9/1973 United Kingdom .
2009590 6/1979 United Kingdom .
2089650 6/1982 United Kingdom .
2098857 12/1982 United Kingdom .

Primary Examiner—Robert W. Jenkins
Attorney, Agent, or Firm—Mason, Fenwick & Lawrence

[57] ABSTRACT

Apparatus for making coffee by the filter method has an integral water reservoir and filter holder (6) of for example a one-piece plastics moulding. The reservoir has a horizontal extension (14) in which the filter holder (13) is located. The reservoir (14) has an integral riser tube (11) for transferring hot water to the filter holder. A filter comprising a moulded one-piece framework (28) that supports a mesh filter material. The base of the filter has spacer ribs (33) that rest on the floor (23) of the filter holder (13). The coffee outlet of the filter holder is closable by an anti-drip device (35) displaceable to permit flow of coffee from the holder (6) when a receptacle is placed beneath the holder.

15 Claims, 10 Drawing Figures

APPARATUS FOR MAKING HOT DRINKS

This invention relates to apparatus for making hot drinks, for example coffee, and has particular reference to apparatus for making coffee by the filter method.

Apparatus for making coffee by the filter method conventionally employs a water reservoir that supplies water via a heater to a filter holder containing a filter paper and ground coffee and the present invention is particularly concerned with apparatus of that general form.

It is an object of the present invention to provide a construction that is more economic to produce and handle than previous forms of apparatus.

According to the present invention, apparatus for making hot drinks comprises a reservoir for water from which the drink is to be made, and a filter holder, the filter holder being an integral part of the reservoir.

In one embodiment of the invention, the reservoir and the filter holder comprises a one-piece moulding of a plastics material.

The reservoir may incorporate an extension in which the filter holder is located at least in part. The filter holder may be spaced from the side and end walls of the extension which may have a floor that slopes downwardly towards the reservoir.

A riser tube which is an integral part of the reservoir may be located within the reservoir.

The filter holder may be of cup-like shape, the internal surfaces of the side wall and base of the holder being smooth.

The holder may have an outlet closable by a one-piece anti-drip device adapted to be displaced to open the outlet on insertion of a receptacle beneath the outlet.

The anti-drip device may comprise a portion adapted to be secured to the filter holder, and a lever resiliently attached to the portion, the lever having, at one end, a surface for receiving a valve member for closing the aperture, and, at the other end a surface for contacting the receptacle.

The apparatus may further include a filter for insertion in the filter holder, the filter comprising an imperforate base and a side wall composed at least in part of a filter material. The filter may consist of a one-piece frame that supports the filter material.

Figure 2:
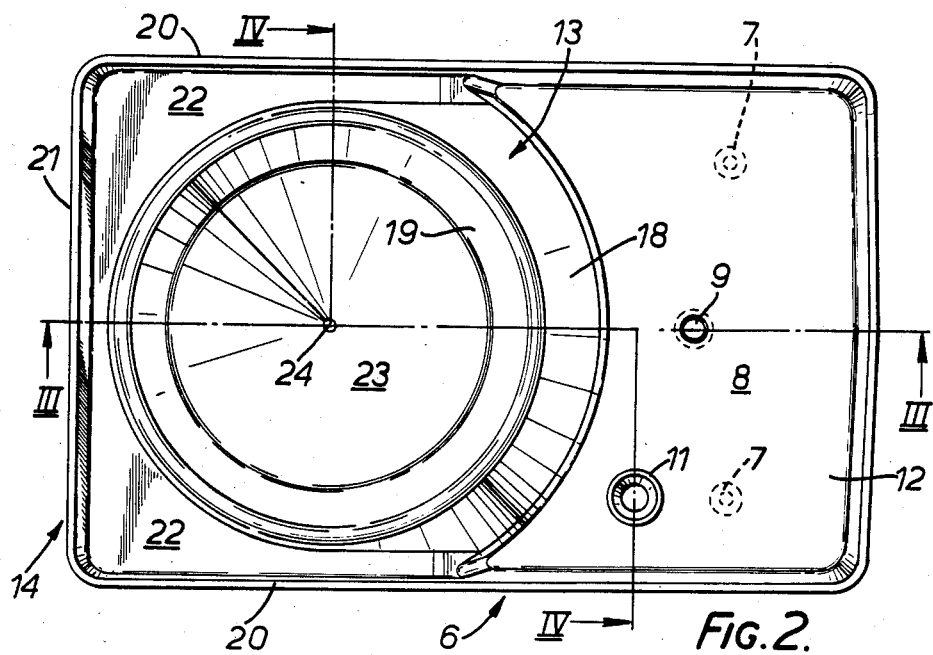
Figure 3:
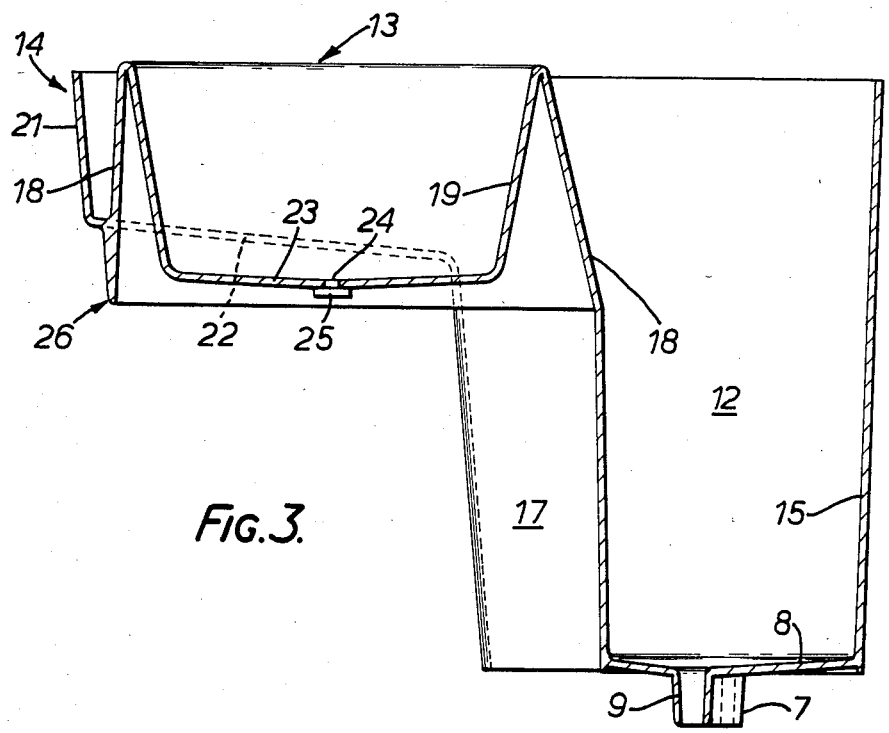
Figure 4:
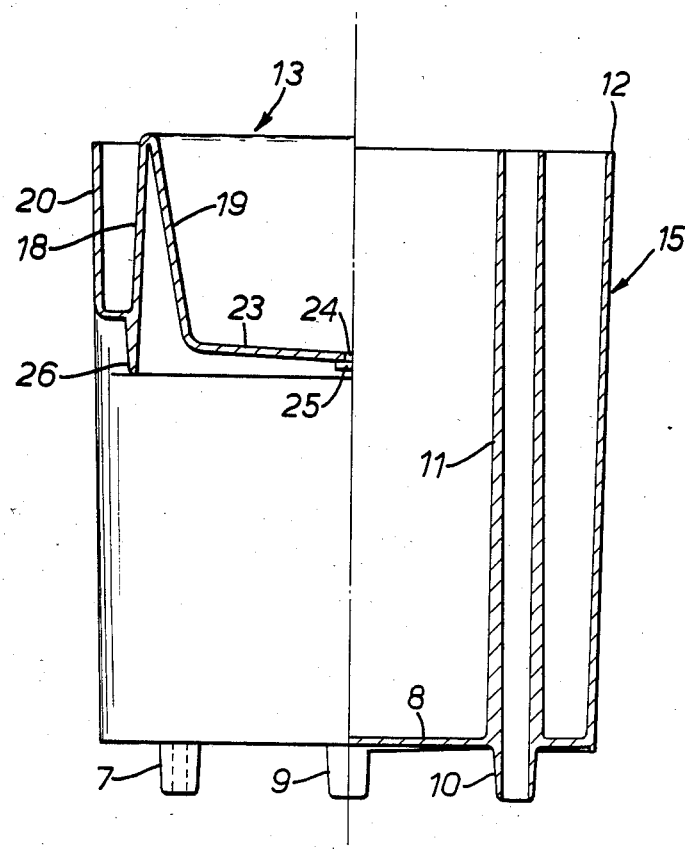
Figure 5:
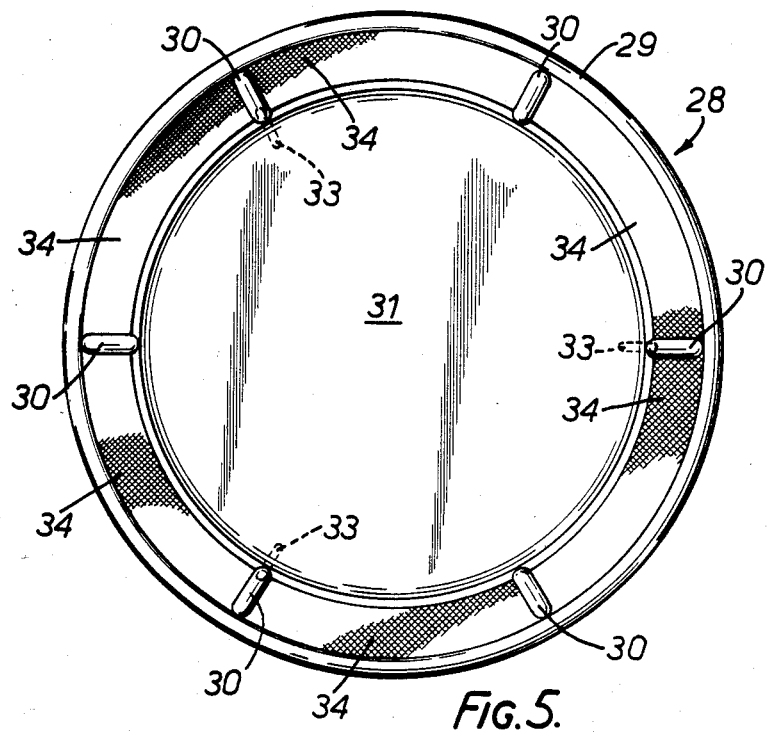
Figure 6:
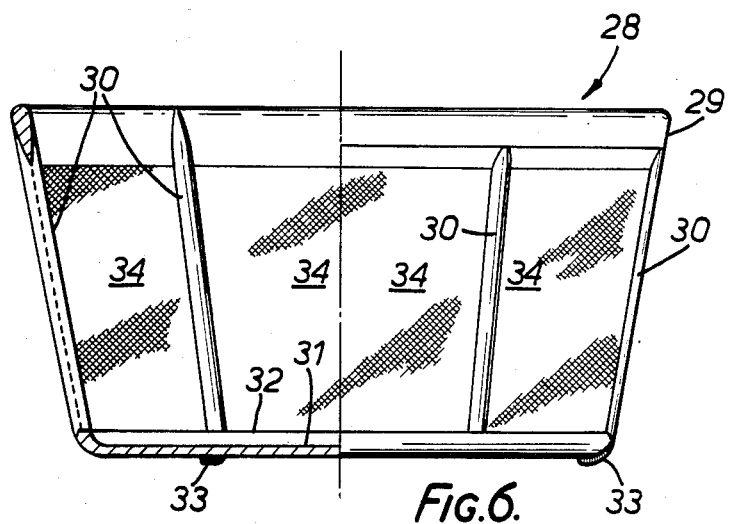
Figure 7:
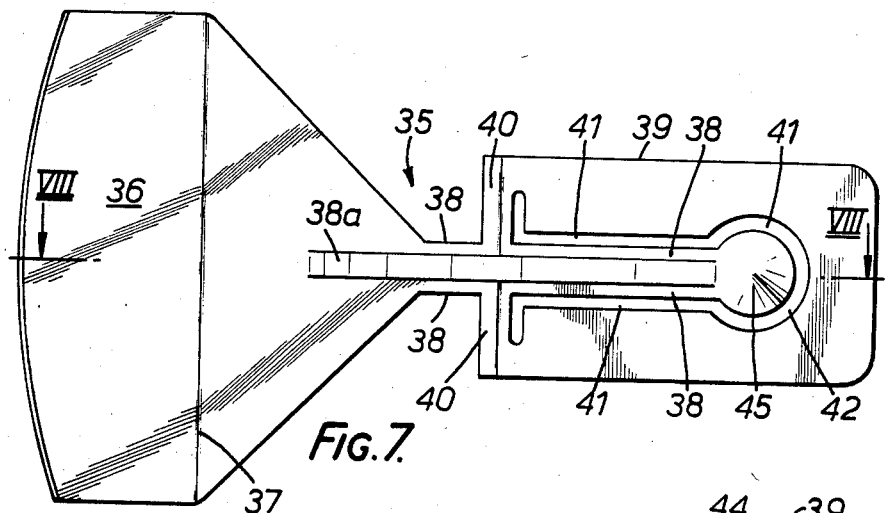
Figure 8:
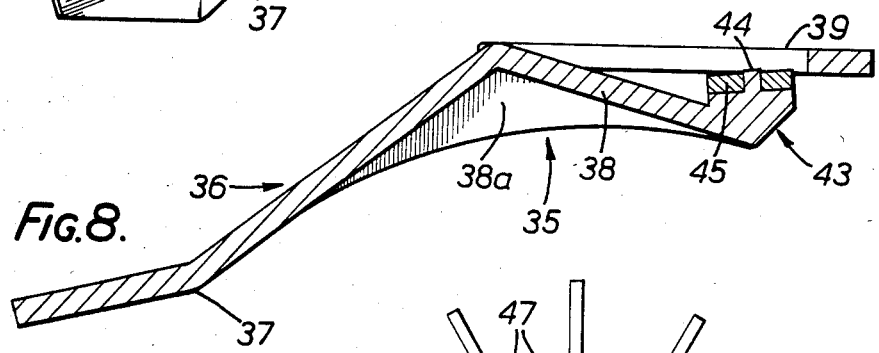
Figure 9:
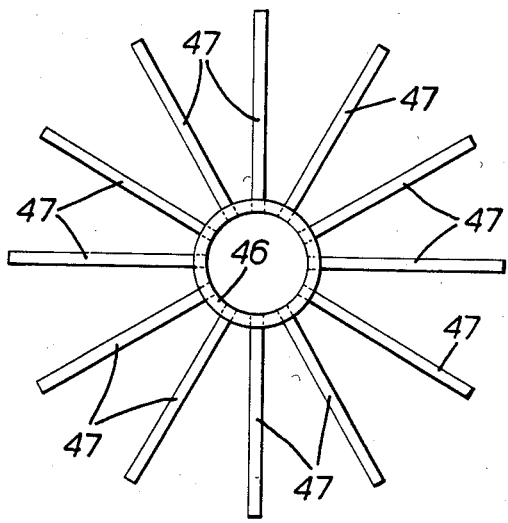
Figure 10:
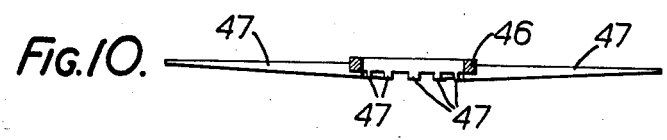

By way of example only, coffee filter apparatus embodying the invention will now be described in greater detail with reference to the accompanying drawings of which:

FIG. 1 is a perspective view in general schematic form of part of the apparatus, FIG. 2 is a plan view, on a slightly larger scale, of a component, FIGS. 3 and 4 are, respectively, sections on the lines III—III and IV—IV of FIG. 2, FIGS. 5 and 6 are, respectively, plan view and side view partly in section of another component, FIG. 7 is an underneath view of a further component, FIG. 8 is a section on the line VIII—VIII of FIG. 7, and FIGS. 9 and 10 are, respectively, plan and side view on a larger scale of another component.

The apparatus shown in FIG. 1 comprises a base 1 contoured to provide an upstanding rear portion 2 and a forward ledge 3 with an inset hot plate 4 for receiving a coffee receptacle (not shown).

Contained in the base 1 is an electric waterheater together with control circuitry for the water heater and for the hot plate 4. FIG. 1 shows the actuating member 5 of an electric switch that controls energisation of the water heater and hot plate. It will be understood that the apparatus is powered from the mains supply of electricity.

The upper surface of the rear portion 2 provides a surface for receiving and supporting a combined water reservoir and filter holder 6. The surface has spaced recesses (not shown) of inverted frusto-conical form in which locate bosses 7 integral with the base 8 of the combined reservoir-holder 6 when the latter is correctly positioned on the surface. To secure the combined reservoir-holder 6 in position, screws (not shown) are passed upwardly through the bases of the recesses and are screwed into the bosses 7.

The surface is also apertured to allow penetration of an outlet pipe 9 in the base 8 and of the lower extremity 10 of a riser tube that is integral with the base 8 and extends upwardly within the combined reservoir-holder 6. The riser tube 11 terminates at the level of the upper edge of the combined reservoir-holder 6.

Internally of the base 1, the outlet pipe 9 is joined by a conduit (not shown) to the inlet of the electric water heater (not shown) whose outlet is joined by another conduit (not shown) to the lower extremity 10 of the riser tube 11.

The combined reservoir-holder 6 is shown in more detail in FIGS. 2, 3 and 4. It is a one-piece moulding of a plastics material, for example SAN/polycarbonate, and comprises a reservoir 12 and a filter holder 13 located in a horizontal extension 14 of the reservoir 12. As has been explained above, the riser tube 11 is integral with the base 8 and is located in the reservoir 12.

The reservoir 12 has vertical side and rear walls 15 contoured to blend smoothly with the contours of the walls of the portion 2 of the base 1. Inner wall 16 of the portion 2 is concavely curved to accommodate more readily the coffee receptacle referred to above and the corresponding front wall 17 of the reservoir 12 is curved in like manner. Wall 17 is continued upwardly within the reservoir to form a support wall 18 for the filter holder 13 which, as can be seen from FIG. 3, is of generally cup-shaped form with a side wall 19 that extends downwardly and inwardly from the upper edge of wall 18 which is thus of frusto-conical form.

The wall 18 is spaced from the side walls 20 of the horizontal extension 14 and from the end wall 21 of the extension.

The extension 14 has a floor 22 that slopes downwardly away from the end wall 21 and merges into the wall 17 as can be seen from FIG. 3.

The filter holder 13 has a base 23 integral with the side wall 19 and apertured centrally at 24 to receive an outlet boss 25.

To improve the visual attractiveness of the combined reservoir-holder 6, a slightly inset vertical flange 26 extends round the lower part of the extension 14 thereby concealing the lower portion of the holder 13.

It will be noted that the internal surfaces of the wall 19 and of the base 23 are quite smooth. The reason for this will be given below.

Detachably mounted on the upper end of the riser tube 11 is a spout 27 that can be swivelled on the tube to extend forwardly over the filter holder 13.

FIGS. 5 and 6 show a filter for use with the apparatus described above and which is intended to be located within the filter holder 13. The filter comprises a moulded, open, one-piece framework 28 of a suitable plastics material, for example nylon, that supports a mesh filter also of a suitable plastics material, for example nylon.

The framework 28 consists of an upper frame member 29 of annular form joined by spaced struts 30 to an imperforate disc-shaped base 31 with an upturned periphery 32. The struts 30 merge smoothly at each end into the frame member 29 and the base 31. The framework 28 is of generally cup-shaped form and is sized to fit into the holder 13. Short, radial downwardly-extending spacer ribs 33 are formed during moulding adjacent the junction between the lower ends of alternate ones of the struts 30 and the upturned periphery 32. When in position in the holder 13, the filter rests on the spacer ribs 33 so that the base 31 is separated by a gap from the floor 23 of the holder 13.

The framework 28 supports the mesh filter 34 which is moulded at its edges into the frame member 29, the struts 30 and the periphery 32 of the base 31. The filter is located centrally of the widths of those parts.

Although not shown in the drawings, a handle may be provided for facilitating the entry into and removal from the holder 13 of the filter. If desired, the handle could be an integral part of the frame member 29.

When in use the combined reservoir holder 6 is covered by a lid (not shown) which fits over the side and end walls 15, 20 and 21.

Carried by the boss 25 is an anti-drip device 35 shown in FIGS. 7 and 8. The device is a one-piece moulding of a suitable plastics material for example that known under the Trade Mark 'KEMATAL'. The device has a sector-shaped tongue 36 cranked as at 37 and attached by an arm 38 to part 39 of the device via lateral extensions 40 that extend outwards acting both as a hie and torsion bar. The arm 38 inclines downwardly from its junction with limbs 40 as can be seen from FIG. 8 and has a stiffening rib 38a. The arm 38 and lateral extensions 40 are separated from the remainder of part 39 of the device by gaps indicated at 41 in FIG. 7, and which terminate in a circular opening 42.

Formed at the end of the arm 38 remote from the tongue 36 is an enlargement 43 having an upper (as seen in FIGS. 7 and 8) surface of circular form with a central projection 44. On that surface is seated a soft washer 45 of a resilient, heat-resistant material, for example silicone rubber.

The anti-drip device 35 is attached to the boss 25 by pressing the latter into the opening 42 which is slightly undersized to provide a force fit on to the boss. When the device is in position, the valve washer 45 closes the opening in the boss 25. If desired, other forms of attachment could be used, for example, the boss 25 may have an external circumferential groove into which the edge of the part 39 round the opening 42 is pressed.

The apparatus is used in the well-known manner. The filter is placed in the holder 13, the ribs 33 resting on the base 23 thereby providing a slight gap between the base 23 and the base 31 of the filter. The reservoir 12 is then filled with water and the required amount of ground coffee placed in the base 23 of the filter.

A coffee receptacle is then placed underneath the filter holder 13, the receptacle resting on the hot plate 4. As the receptacle is inserted beneath the filter holder, the edge of the receptacle contacts the tongue 36 and pivots the latter upwardly. Upward pivotal movement of the tongue 36 about the transverse limbs 40 stresses the latter and also causes the ends of the limbs 38 remote from the tongue 36 to move downwardly carrying the valve washer 45 away from the opening in the boss 25.

By actuating control member 5, the electric heater and hot plate are energised and after a few minutes hot water feeds up riser tube 11 and passes via spout 27 into the filter and over the ground coffee therein.

The water level in the filter slowly rises and quickly reaches a point where it flows through the mesh filter 34, downwards between the filter and the wall 19, into the gap between the base 31 of the filter and the base 23 of the filter holder 13 and out through the opening in the boss 25 and into the coffee receptacle now being warmed by the hot plate 4.

The rate of flow of hot water into the filter is calculated to give the hot water a residence time in the filter sufficient to produce a satisfactory infusion of coffee into the water. When hot water is delivered from the spout, the coffee has to steep in it for a short period until the water level builds up sufficiently to overcome surface tension effects and allow the water to discharge through the mesh filter. Because the base 31 of the filter is imperforate hot water cannot trickle directly through the coffee but must flow sideways through the mesh filter as just described.

When the water content of the reservoir has flowed into the filter, the receptacle is removed so that a user can pour coffee in the receptacle into cups. Removal of the receptacle allows the stressed limbs 40 to restore and this seats the washer 45 on the boss 25 thereby closing the opening therein and preventing coffee dripping on to the hot plate 4. The tongue 36 also returns to its initial position.

After use, the apparatus is extremely easy to clean. The filter can be lifted out using the handle, if provided, and after the coffee grounds have been emptied out the mesh filter can be cleaned by rinsing under running water. The filter holder can also be rinsed out and wiped clean, the smooth surface of the wall 19 and base 23 making cleaning very simple.

Use of a filter as just described improves the taste of the coffee. As the filter is re-usable after being cleaned, it is cheaper in the long term, than conventional filter papers that are not re-usuable. In addition, the filter eliminates the need to include a flow control in the coffee filter machine because the coffee is automatically infused correctly.

In the event that, for some reason, the filter holder becomes blocked, overflow from the filter holder 13 will pass into the extension 14 of the reservoir and not down the sides of the apparatus and on to the hot plate as in conventional forms of apparatus.

Furthermore, the extension 14 increases the capacity of the reservoir 12 as compared with conventional forms of apparatus, the sloping floor 22 ensuring that all the water in the extension runs back into the reservoir 12.

The combining of the filter holder and reservoir into a single component reduces manufacturing and handling and assembly costs as compared with conventional forms of apparatus.

If desired, the filter described above could be replaced by a so-called "cup-cake" filter paper in cases where finer filtering is required. Such a filter paper requires the use of a spacer to hold the base of the filter away from the base 23 of the filter holder and a suitable form of spacer is shown in FIGS. 9 and 10.

The spacer comprises a moulded frame of a suitable plastics material, for example polypropylene having a central annulus 46 from the lower edge of which extend a number of spaced radial arms 47 that taper outwards from the central annulus 46.

The "cup-cake" filter paper has convoluted or folded side walls and is placed in the filter holder with the base of the paper seated upon the spacer which itself rests on the base 23 of the filter holder.

The spacer ensures that the base of the filter paper is spaced from the base 23 by a gap through which the filtered coffee flows. The convoluted or folded walls provide passages through which the coffee reaches that gap.

The use of the apparatus with a filter paper is basically the same as with the mesh filter.

After use, the filter paper carrying the coffee grounds is removed. The spacer can then be taken out of the holder and washed easily as can the inside of the holder itself.

It is not essential to mould the riser tube 11 integrally with the combined reservoir-holder but it is preferred to do so. A separate riser tube plugged into the base 8 of the reservoir could be used.

In addition, whilst it is preferred to mould the filter holder with smooth walls because this facilitates cleaning of the holder and is a simpler and more economic design, it is possible to mould ridges or grooves in the inner surfaces of the wall 19 and the base 23 to support a conventional filter paper which is then used instead of the filter described above with reference to FIGS. 5 and 6.

It is, of course, also possible to mould in the base 23 spacer elements that support the imperforate base 31 above the base 23 of the filter holder. Such spacer elements correspond in function with the spacer ribs 33 described above.

I claim:

1. Apparatus for making hot drinks by passing hot water through a filter containing solids from which the drink is to be made, to yield an infusion which is collected in a receptacle, the apparatus comprising a reservoir for water from which the drink is to be made, a heater, a filter holder which is shaped to contain the filter and has an outlet for an infusion from the filter, and means for supplying water from the reservoir, via a heater, to the filter holder, and in which the filter holder is formed as an integral part of the reservoir.

2. Apparatus as claimed in claim 1, in which the reservoir and filter holder comprise a one-piece moulding of a plastics material.

3. Apparatus of the drip-feed type for making hot drinks by passing hot water through a filter containing solids from which the drink is to be made, to yield an infusion which is collected in a receptacle, the apparatus comprising a reservoir for water from which the drink is to be made, a heater, a filter holder which is shaped to contain the filter and has an outlet for an infusion to pass from the filter to a receptacle, and means for supplying water from the reservoir, via a heater, to the filter holder, and in which the filter holder is located permanently within the reservoir.

4. Apparatus as claimed in claim 3 in which the means for supplying water from the reservoir to the filter holder includes a riser tube which is located within the resevoir and is an integral part thereof.

5. Apparatus as claimed in claim 3 in which the filter holder outlet is closable by a one-piece anti-drip closure co-operable with a receptacle inserted beneath the outlet to be displaced thereby to open the outlet.

6. Apparatus as claimed in claim 5 in which the anti-drip closure comprises a portion adapted to be secured to filter holder, and a lever resiliently attached to the portion, the lever having, at one end a surface for receiving a valve member for closing the outlet and, at the other end a surface for contacting the receptacle.

7. Apparatus as claimed in claim 6 in which the attachment of the lever is located between the ends thereof.

8. Apparatus as claimed in claim 7 in which portion is of strip-like form with a longitudinal slot beneath which part of the lever is located, and in which arms formed transversely of the slot, at one end thereof, attach the lever to the portion.

9. Apparatus as claimed in claim 3 in which the reservoir has an extension, and in which the filter holder is located, at least in part, in the extension.

10. Apparatus as claimed in claim 9 in which the filter holder is spaced from the side and end walls of the extension.

11. Apparatus as claimed in claim 9 in which the extension has a floor that slopes downwardly towards the reservoir.

12. Apparatus as claimed in claim 3 in which the filter holder is of cup-like shape, the internal surfaces of the side wall and base of the holder being smooth.

13. Apparatus as claimed in claim 3 and further comprising a filter for insertion in the filter holder, the filter comprising an imperforate base and a side wall composed at least in part of a filter material.

14. Apparatus as claimed in claim 13 in which the filter comprises a one-piece frame that supports the filter material.

15. Apparatus as claimed in claim 13 in which the base incorporates downwardly extending spacer ribs.

* * * * *